US012304195B2

(12) United States Patent
Kanou

(10) Patent No.: US 12,304,195 B2
(45) Date of Patent: May 20, 2025

(54) IMAGE FORMING APPARATUS AND CONTROL METHOD

(71) Applicant: KONICA MINOLTA, INC., Tokyo (JP)

(72) Inventor: Kunihiko Kanou, Tokoname (JP)

(73) Assignee: KONICA MINOLTA, INC., Tokyo (JP)

( * ) Notice: Subject to any disclaimer, the term of this patent is extended or adjusted under 35 U.S.C. 154(b) by 230 days.

(21) Appl. No.: 18/078,829

(22) Filed: Dec. 9, 2022

(65) Prior Publication Data

US 2023/0202207 A1 Jun. 29, 2023

(30) Foreign Application Priority Data

Dec. 23, 2021 (JP) ................................ 2021-209077

(51) Int. Cl.
*B41J 11/00* (2006.01)
*B41J 2/21* (2006.01)
*B65H 5/02* (2006.01)

(52) U.S. Cl.
CPC ............... *B41J 11/007* (2013.01); *B41J 2/21* (2013.01); *B65H 5/025* (2013.01); *B41J 2203/01* (2020.08); *B65H 2301/3611* (2013.01)

(58) Field of Classification Search
CPC ........ B41J 11/007; B41J 2/21; B41J 2203/01; B65H 5/025; B65H 2301/3611
See application file for complete search history.

(56) References Cited

U.S. PATENT DOCUMENTS

| | | | | |
|---|---|---|---|---|
| 2005/0088503 A1* | 4/2005 | Kojima | B41J 2/16585 | 347/101 |
| 2005/0219557 A1* | 10/2005 | Koike | B41J 11/0065 | 358/1.12 |
| 2015/0336406 A1* | 11/2015 | Hobo | B41J 13/103 | 347/104 |
| 2018/0329347 A1* | 11/2018 | Nishikawa | G03G 15/5062 | |

FOREIGN PATENT DOCUMENTS

| | | | | |
|---|---|---|---|---|
| EP | 3680107 A1 * | 7/2020 | | B41J 11/007 |
| JP | H10-139202 A | 5/1998 | | |
| JP | 2020104435 A * | 7/2020 | | B41J 11/007 |
| JP | 2021134073 A * | 9/2021 | | |

* cited by examiner

*Primary Examiner* — Sharon Polk
(74) *Attorney, Agent, or Firm* — Squire Patton Boggs (US) LLP

(57) ABSTRACT

An image forming apparatus is provided that is aimed to control adverse impacts on a printing quality caused by the meandering motion of a printing belt and changes of a feeding speed. The image forming apparatus includes: one or more printing portions that print a printing object on paper; a belt in a form of a loop, the belt serving to transport the paper to a printing position; a roller that feeds the belt; a phase detector that detects a phase of the belt; a behavior detector that detects a behavior of the belt; a controller that decides a paper setting position on the belt based on the behavior of the belt for each phase; and a paper feeder that transports the paper to the paper setting position.

20 Claims, 9 Drawing Sheets

IMAGE FORMING APPARATUS AND CONTROL METHOD

The entire disclosure of Japanese Patent Application No. 2021-209077, filed on Dec. 23, 2021, is incorporated herein by reference in its entirety.

BACKGROUND

Technological Field

This disclosure relates to an image forming apparatus, more particularly to a technology used to decide a paper setting position on a belt for printing use.

Description of the Related Art

There are known inkjet image forming apparatuses that form images using printing means and paper transport means in collaboration with each other. Such an inkjet image forming apparatus transports paper disposed on an endless belt (looped belt, hereinafter, "belt") and discharges ink onto the surface of paper being transported to form an image(s) thereon.

The belt, with one end and the other end being joined to each other, is formed into the shape of a loop. In case the joint of the belt accidentally contacts the transport roller of the belt, the following events may occur; variability of the belt feeding speed, and/or movement of the belt perpendicularly to the belt feeding direction (hereinafter, the belt movement perpendicular to the feeding direction may be referred to as "meandering" or "meandering motion"). The feeding speed variability and/or the meandering motion of the belt may adversely affect the printing quality.

Japanese Laid-Open Patent Publication No. H10-139202 describes a controller in regard to the belt control, "the controller inputs a side-end position of a paper transport belt in response to the timing of detection of a home position mark formed on the paper transport belt, and then calculates data of any differential of this position to a position detected at the same spot in the previous cycle. The controller corrects the differential data based on a meandering cycle of the belt to obtain meandering motion data, and then controls the meandering motion based on the data thus obtained" (see the Abstract of the Disclosure).

The technology described in Japanese Laid-Open Patent Publication No. H10-139202 may succeed in control, to a certain extent, of possible adverse impacts on the printing quality caused by the meandering motion. Yet, the printing quality may still be affected by the belt feeding speed or meandering motion depending on where a paper setting position is located (for example, near the belt joint). A more advanced technology is desirably developed and made available that can more reliably control any adverse impacts on the printing quality caused by the meandering motion and/or unstable feeding speed of the belt.

SUMMARY

To address the issues of the known art, this disclosure is directed to, in an aspect, providing a technology that can more reliably control adverse impacts on the printing quality caused by the meandering motion and/or unstable feeding speed of the belt.

In an embodiment of this disclosure, an image forming apparatus is provided. To achieve at least one of the abovementioned objects, according to an aspect of the present disclosure, the image forming apparatus reflecting one aspect of the present disclosure includes: one or more printing portions that print a printing object on paper; a belt in a form of a loop, the belt serving to transport the paper to a printing position; a roller that feeds the belt; a phase detector that detects a phase of the belt; a behavior detector that detects a behavior of the belt; a controller that decides a paper setting position on the belt based on the behavior of the belt for each phase; and a paper feeder that transports the paper to the paper setting position.

BRIEF DESCRIPTION OF THE DRAWINGS

The advantages and features provided by one or more embodiments of the disclosure will become more fully understood from the detailed description given hereinbelow and the appended drawings which are given by way of illustration only, and thus are not intended as a definition of the limits of the present disclosure.

DETAILED DESCRIPTION OF EMBODIMENTS

Hereinafter, one or more embodiments of the present disclosure will be described with reference to the drawings. However, the scope of the disclosure is not limited to the disclosed embodiments.

Embodiments of the technical idea disclosed herein are hereinafter described with reference to the accompanying drawings. In the description below, like components are illustrated with the same reference signs. Also, they are referred to likewise and have similar functional features. Such components, therefore, will not be repeatedly described in detail.

<A. Image Forming Apparatus>

First, referring to FIGS. 1 to 4, the operation outline and hardware elements of an image forming apparatus according to this embodiment are described. The description hereinafter given is premised on that the image forming apparatus is an inkjet printer. The applicable range of the technology disclosed herein, however, is not necessarily limited to inkjet printers. In an aspect of this disclosure, the image forming apparatus may be a laser printer.

Figure 1:
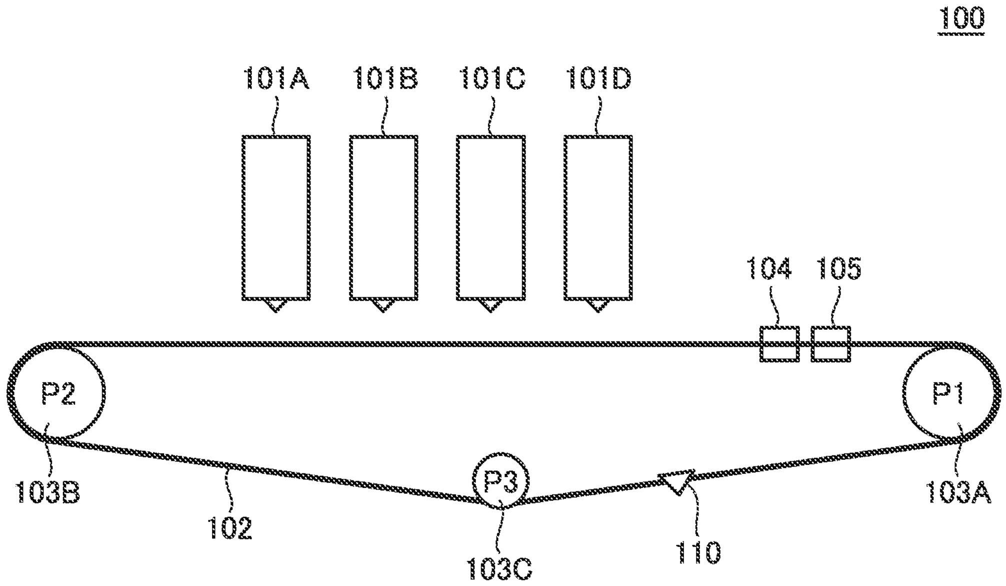
FIG. 1 is a drawing that illustrates an example of hardware elements associated with a printing process for paper in an image forming apparatus according to an embodiment of this disclosure.

FIG. 1 is a drawing that illustrates an example of hardware elements associated with a printing process for paper in the image forming apparatus according to this embodiment. With reference to FIG. 1, the hardware elements associated with the paper printing process by an image forming apparatus 100 are hereinafter described.

The hardware elements associated with the paper printing process of image forming apparatus 100 include a plurality of printing portions 101A, 101B, 101C and 101D, a belt 102, transport rollers 103A, 103B and 103C, a behavior detector 104, and a phase detector 105. Belt 102 has a joint 110. In the description below, printing portions 101A, 101B, 101C and 101D may be collectively referred to as printing portions 101. Likewise, transport rollers 103A, 103B and 103C may be collectively referred to as rollers 103. With reference to printing portions 101 and rollers 103 illustrated in FIG. 1, this drawing shows just one example regarding the number of the printing portions, the number of the rollers, and manners of arrangement of the printing portions and rollers. Image forming apparatus 100 may be equipped with an optional number of printing portions 101 and an optional number of rollers 103, and printing portions 101 and rollers 103 may be disposed at other optional positions as required.

Printing portions 101 are each a unit that forms an image on paper. In an aspect of this disclosure, printing portion 101 may be an inkjet printer. In this instance, each printing portion 101 has a nozzle at its edge and discharges ink through this nozzle to a surface of paper being transported on belt 102, thus forming an image on the surface. In another aspect of this disclosure, printing portion 101 may be a toner printer. In this instance, belt 102 may be an intermediate transfer belt. In this instance, printing portion 101 forms a toner image on the intermediate transfer belt through a photoreceptor. The toner image is transported on the intermediate transfer belt and then transferred by a roller onto paper.

In the case of inkjet printing portions 101, the technology described herein decides a paper setting position (printing position) on belt 102 to ensure a constant level of printing quality. In the case of tone printing portions 101, the technology described herein decides a transfer position of the toner image on belt 102 to ensure a constant level of printing quality. The technology disclosed herein is hereinafter described in detail using the inkjet printing technique. The technology disclosed herein is also applicable to a toner image forming apparatus, in which case the "paper setting position on belt 102" is replaced with the "transfer position of the toner image on belt 102".

Belt 102 is an endless belt (looped belt) that transports paper to positions below printing portions 101. An image is formed on the surface of this transported paper by a timing of arrival of the paper at a position immediately below each printing portion 101. The toner image forming apparatus, on the other hand, directly transfers an image onto belt 102 (intermediate transfer belt). Belt 102 is driven by one or more rollers 103.

Roller(s) 103 may be driven by a motor to rotate and thereby feed belt 102. In an aspect of this disclosure, all of rollers 103 may be driven by the motor. In another aspect of this disclosure, rollers 103 in part may be driven by the motor. In this instance, any roller(s) 103 unconnected to the motor may serve as, for example, a pulley(s).

Rollers 103 or the motor that drives rollers 103 may be equipped with an encoder. Image forming apparatus 100, by receiving a signal from the encoder and analyzing the received signal, may be allowed to estimate a driving amount of belt 102 or a transport amount of paper. In an aspect of this disclosure, all of rollers 103 may be each equipped with an encoder. In another aspect of this disclosure, rollers 103 in part may be each equipped with an encoder.

Behavior detector 104 detects the behavior of belt 102. The "behavior" may include both of: movement of belt 102 in its feeding direction (for example, changes of the belt speed (rate of acceleration), cumulative value of the belt speed changes, amount of the belt movement); and movement of belt 102 in a meandering direction (for example, changes of the belt speed, cumulative value of the belt speed changes, amount of the belt movement). The speed of belt 102 in its feeding direction may be hereinafter referred to as "belt speed". A direction perpendicular to the feeding direction of belt 102 may be referred to as "meandering direction", a speed in the direction perpendicular to the feeding direction of belt 102 may be referred to as "meandering speed", and an amount of movement in the direction perpendicular to the feeding direction of belt 102 may be referred to as "meandering amount". Movement of belt 102 in the meandering direction may be referred to as "meander" or "meandering (motion)".

In an aspect of this disclosure, behavior detector 104 may include an optional sensor, examples of which include a laser sensor, an infrared sensor, or a camera-equipped sensor. In another aspect of this disclosure, behavior detector 104 may include a plurality of sensors. In this instance, these sensors may be all disposed in one place or may be disposed at different positions away from each other.

Behavior detector 104 outputs information regarding the behavior of belt 102 to a CPU (Central Processing Unit) 401 (see FIG. 4) of image forming apparatus 100. In an aspect of this disclosure, behavior detector 104 may output signals from the sensors to CPU 401 as information regarding the behavior of belt 102. In another aspect of this disclosure, behavior detector 104 may output, to CPU 401, digital data of the amount of behavior of belt 102 calculated based on the signals from the sensors using a circuit, for example, a controller incorporated in this detector.

Phase detector 105 detects the phase of belt 102. The "phase" may refer to the position of belt 102. Supposing that joint 110 is a reference position, the phase of belt 102 may present a position at which joint 110 is currently located. In an aspect of this disclosure, phase detector 105 may include an optional sensor, for example, a light-receptive sensor or an encoder. In another aspect of this disclosure, phase detector 105 may include a plurality of sensors. In this instance, these sensors may be all disposed in one place or may be disposed at different positions away from each other. In yet another aspect of this disclosure, an encoder attached to roller 103 or a motor connected to roller 103 may be used as part of phase detector 105. Phase detector 105 may be equipped with an encoder. In yet another aspect of this disclosure, phase detector 105 may be used as part of behavior detector 104 to detect the behavior of belt 102 in its feeding direction (for example, changes of the belt speed (rate of acceleration), cumulative value of the belt speed changes, amount of the belt movement).

Phase detector 105 outputs information regarding the phase (position) of belt 102 to CPU 401 of image forming apparatus 100. In an aspect of this disclosure, phase detector 105 may output signals from the sensors to CPU 401 as information regarding the behavior of belt 102. In another aspect of this disclosure, phase detector 105 may output, to CPU 401, digital data of the phase of belt 102 calculated based on the signals from the sensors using a circuit, for example, a controller incorporated in this detector.

In order to reduce adverse impacts on the printing quality caused by the behavior of belt 102, CPU 401 decides a paper setting position on the belt 102 based on the behavior-related information of belt 102 obtained from behavior detector 104 and the phase-related information of belt 102 obtained from phase detector 105 (based on the per-phase behavior of belt 102). In an aspect of this disclosure, CPU 401 may select a phase or an interval in which the behavior of belt 102 reduces to the minimum (or interval from a phase to another phase of the belt) and then decide the paper setting position, so that the printing process is carried out during the phase or interval thus selected. In another aspect of this disclosure, CPU 401 may select a phase or an interval in which the behavior of belt 102 is less than or equal to a predefined threshold and then decide the paper setting position to allow the printing process to be carried out during the phase or interval thus selected. Thus, CPU 401 may be allowed to decide the paper setting position, so that the behavior of the belt reduces to the minimum or is less than or equal to the predefined threshold during a period in which the paper is passing one or more printing portions 101 used in the printing.

Figure 2:
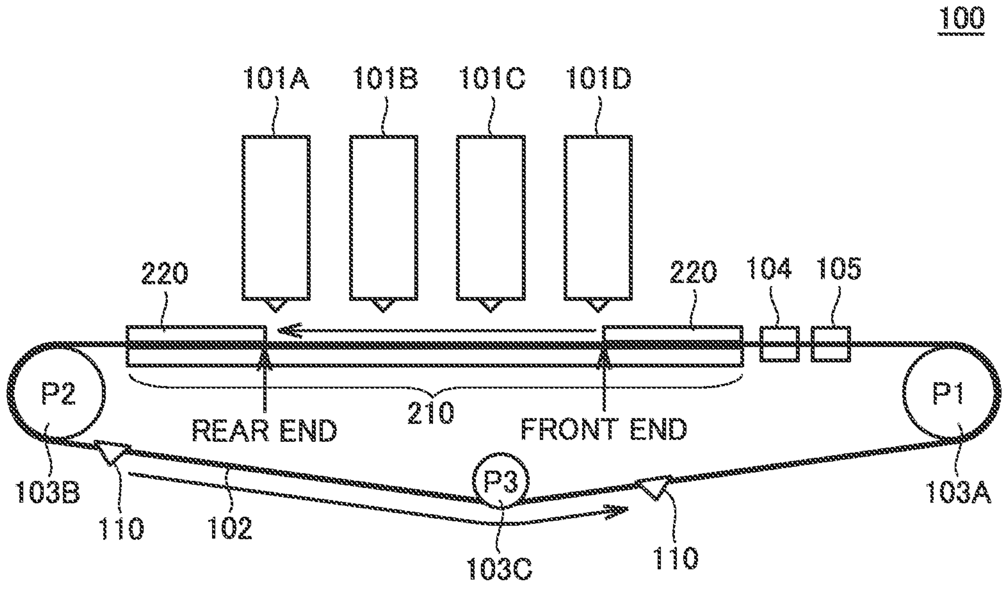
FIG. 2 is an exemplified operation outline of an image forming apparatus 100.

FIG. 2 is an exemplified operation outline of an image forming apparatus 100. Referring to FIG. 2, adverse impacts on the printing quality caused by the behavior of belt 102 and a sequence of steps before image forming apparatus 100 decides the paper setting position are hereinafter described.

In the example illustrated in FIG. 2, belt 102 rotates anticlockwise. Paper 220 is transported from a paper feeder 408 (see FIG. 4) by, for example, a roller(s) and then set on belt 102. Printing portions 101A, 101B, 101C, 101D each discharge ink by a timing of paper 220 passing a position immediately below the nozzle of each printing portion. Paper 220 on which an image has been formed is transported to a downstream side and then discharged.

In case the belt 102 changes its transport speed or starts to meander by a timing of ink discharge from printing portion 101, an image to be formed on paper 220 may possibly be distorted. Belt 102 should most desirably transport paper 220 at a constant speed without any meandering motion. Yet, pursuing to completely eliminate the risks of transport speed changes and meandering motion of belt 102 is probably not a down-to-earth approach since the factors possibly leading to these risks, for example, joint 110 of belt 102, hardware errors and hardware degradation, may be mostly unavoidable.

To address this issue, image forming apparatus 100 detects the behavior of belt 102 for each phase based on information regarding the behavior of belt 102 obtained from behavior detector 104 and information regarding the phase (position) of belt 102 obtained from phase detector 105. Image forming apparatus 100 sets the paper at a position that may be hardly affected by the behavior of belt 102.

Significant changes of the behavior of belt 102 may be likely to occur when joint 110 of this belt passes rollers 103. Belt 102 with Joint 110 may often have a stepped or distorted surface. When joint 110 is passing rollers 103, belt 102 may possibly change its transport speed or start to meander. Such a behavior of belt 102 when joint 110 is passing rollers 103 may adversely affect the printing process.

Image forming apparatus 100 may decide the setting position of paper 220, so that the printing process can be carried out by a timing of joint 110 not passing roller 103. An example is given, in which image forming apparatus 100 needs to feed belt 102 by a distance indicated with an interval 210 to carry out the printing process for paper 220. Interval 210 indicates a distance required for a front end of paper 220 to arrive at a position immediately below the nozzle of printing portion 101D (printing start position) and for a rear end of paper 220 to pass a position immediately below the nozzle of printing portion 101A (printing end position). Image forming apparatus 100 may decide the setting position of paper 220, so that paper 220 is transported by the distance of interval 210 by a timing of joint 110 not passing roller 103. This may be rephrased that image forming apparatus 100 selects, from the whole length of belt 102, a certain interval of this belt including a distance required for the printing process and hardly affected by the behavior of belt 102. Specifically, image forming apparatus 100 may be allowed to decide the setting position of paper 220 in a manner that the behavior of belt 102 lessens during a period in which paper 220 is passing each of printing portions 101.

All of the factors likely to adversely affect the behavior of belt 102 may be effectively controllable by thus selecting, from the whole length of belt 102, a certain interval of this belt including a distance required for the printing process and hardly affected by the behavior of belt 102. For instance, the behavior of belt 102 may possibly be disturbed by production errors of printing-related components, or the behavior of belt 102 may possibly be changed by degradation of the printing-related components. In such an instance, image forming apparatus 100 may still be allowed to keep a constant printing quality by selecting, from the whole length of belt 102, a certain interval of this belt including a distance required for the printing process and hardly affected by the behavior of belt 102.

In an aspect of this disclosure, image forming apparatus 100 may decide the distance of interval 210 based on an image printed on paper 220. When an image is printed near the center of paper 220, for example, interval 210 indicates a distance required for a front end of an image printing position on paper 220 to arrive at the printing start position and for a rear end of the image printing position on paper 220 to pass the printing end position. Supposing that a particular ink alone (for example, ink of printing portion 101A) is used to print an image, interval 210 may present a distance required for the front end of the image printing position on paper 220 to arrive at a position immediately below a particular one of printing portions 101 (for example, printing portion 101A) and for the rear end of the image printing position on paper 220 to pass a position immediately below a particular one of printing portions 101 (for example, printing portion 101A). Specifically, image forming apparatus 100 may be allowed to select, from printing portions 101 of different colors, one or more printing portions 101 to be used in the printing process and then decide the setting position of paper 220 in a manner that the behavior of belt 102 lessens during a period in which paper 220 is passing the one or more printing portions 101 to be used in the printing process.

When one or some of printing portions 101 are used, image forming apparatus 100 may select one or more printing portions 101 to be used in the printing process based on a user's input (request for color). Image forming apparatus 100 may select one or more printing portions 101 to be used in the printing process based on a result of analysis of image data (ink type(s) to be used).

The result of image data analysis may include an ink coverage. In this instance, image forming apparatus 100 may adjust the paper setting position with reference to the ink coverage. The "ink coverage" refers to the ratio of an ink included in an image. An example is given, in which printing portions 101A and 101B (inks A, B) are used in the printing process, and ratios of these inks in an image to be printed are; 80% for ink A, and 20% for ink B. In the given example, image forming apparatus 100 may be allowed to adjust the paper setting position in a manner that the behavior of belt 102 during the discharge of ink A is controlled with a higher priority. For example, the behavior of belt 102 near each printing portion 101 or an allowable value (threshold) for the behavior of belt 102 near each printing portion 101 is multiplied by a coefficient (for example, coverage based coefficient) depending on the ink coverage. Thus, image forming apparatus 100 may be allowed to adjust the paper setting position in accordance with priority. This may allow image forming apparatus 100 to flexibly adjust the paper setting position in response to an amount(s) of ink(s) used (ink coverage).

In another aspect of this disclosure, image forming apparatus 100 may select a plurality of intervals used in the printing process from the whole length of belt 102. In this instance, image forming apparatus 100 may detect a phase in which any impact caused by the behavior of belt 102 is less than or equal to a predefined threshold based on information regarding the behavior of belt 102 obtained from behavior detector 104 and information regarding the phase (position) of belt 102 obtained from phase detector 105. Then, image forming apparatus 100 may be allowed to select a plurality of intervals that can include the phase alone in which any impact caused by the behavior of belt 102 is less than or equal to the predefined threshold. These intervals may be continuous to or may be spaced apart from each other. Thus, image forming apparatus 100 may be allowed to perform a very efficient printing process by selecting a plurality of intervals less or hardly affected by the behavior of belt 102.

In another aspect of this disclosure, image forming apparatus 100 may estimate whether belt 102 is degraded based on the detected behavior of belt 102. In one example, image forming apparatus 100 may determine that belt 102 has degraded in quality based on that both or one of the behavior of belt 102 in its feeding direction and the behavior of belt 102 in the meandering direction is greater than a predefined threshold. Image forming apparatus 100 may output a notice to, for example, a display-equipped output portion 407 (see FIG. 4); a component of apparatus 100, when the degradation of belt 102 is confirmed. Otherwise, image forming apparatus 100 may output (transmit) the notice to another apparatus through a communication portion 409 or may output the notice to both of output portion 407 and communication portion 409. This may allow image forming apparatus 100 to keep a constant printing quality and to notify a user or an administrator of belt 102 degraded in quality.

Figure 3:
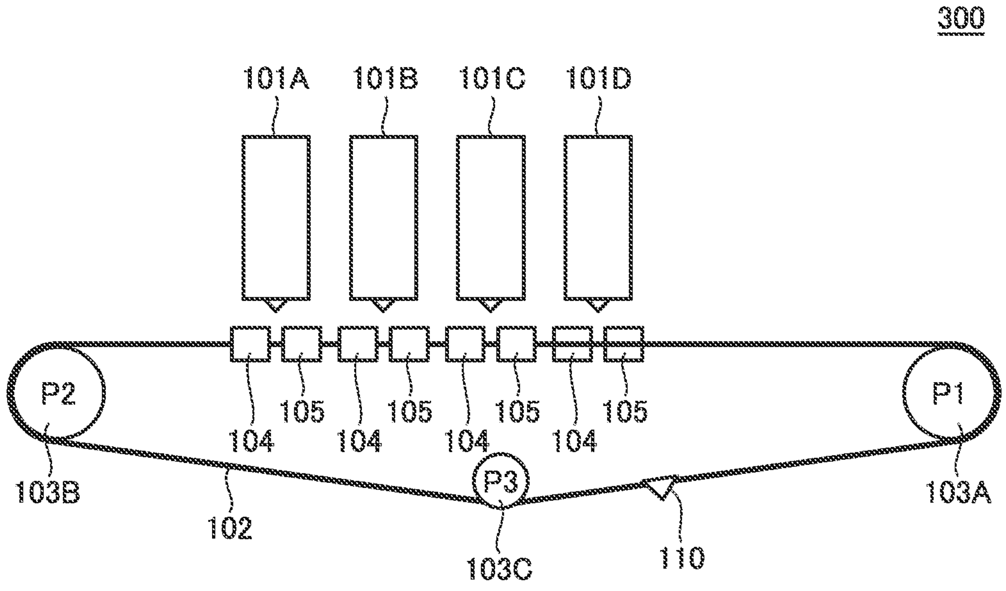
FIG. 3 is a drawing that illustrates another example of hardware elements associated with the paper printing process in the image forming apparatus according to the embodiment.

FIG. 3 is a drawing that illustrates another example of hardware elements associated with the paper printing process in the image forming apparatus according to this embodiment. With reference to FIG. 3, the hardware elements associated with the paper printing process of image forming apparatus 300 are hereinafter described.

Unlike image forming apparatus 100, image forming apparatus 300 includes a plurality of behavior detectors 104 and a plurality of phase detectors 105. Behavior detectors 104 and phase detectors 105 are respectively disposed at positions in the vicinity of printing portions 101. CPU 401 detects the behavior of belt 102 in the vicinity of each printing portion 101 for each phase using a respective one of behavior detectors 104 and of phase detectors 105 disposed near each printing portion 101.

Image forming apparatus 300 may be allowed to decide the paper setting position based on an image to be printed on the paper and the detected behavior of belt 102 for each phase in the vicinity of each printing portion 101. When, for example, printing portion 101A (ink A) alone is used in the printing process, image forming apparatus 300 may be allowed to decide the paper setting position based on results of detection obtained by behavior detector 104 and phase detector 105 disposed at positions near printing portion 101A. In another example, when a plurality of printing portions (for example, printing portion 101A (ink A), printing portion 101B (ink B)) are used in the printing process, image forming apparatus 300 may be allowed to decide the paper setting position based on results of detection obtained by behavior detectors 104 and phase detectors 105 disposed at positions in the vicinity of these printing portions 101 to be used in the printing process.

In an aspect of this disclosure, image forming apparatus 300 may be allowed to decide the setting position of paper 220 in a manner that the behavior of belt 102 lessens during a period in which paper 220 is passing each of printing portions 101 similarly to image forming apparatus 100. Specifically, image forming apparatus 300 may be allowed to select, from printing portions 101 of different colors, one or more printing portions 101 to be used in the printing process and then decide the setting position of paper 220 in a manner that the behavior of belt 102 lessens during a period in which paper 220 is passing the one or more printing portions 101 to be used in the printing process. Image forming apparatus 300 may select one or more printing portions 101 to be used in the printing process based on a user's input (request for color) or a result of analysis of image data (ink type(s) and color(s) to be used, amount(s) of ink(s), ratio(s) of ink(s)). In this instance, image forming apparatus 300 may adjust the paper setting position with reference to the ink coverage.

In another aspect of this disclosure, image forming apparatus 300 may decide the coefficient described earlier based on printing settings of a user's input through an input portion 406 (see FIG. 4) (optional settings including which ink(s) should be used, ratio(s) of ink(s) used, level(s) of importance of ink(s)). This may allow image forming apparatus 300 to flexibly adjust the paper setting position in response to a user's request (for example, which ink should be regarded as particularly important).

In another aspect of this disclosure, this image forming apparatus may have one phase detector 105. In this instance, image forming apparatus 300 may be allowed to carry out the processing steps described earlier based on a common phase obtained from one phase detector 105 and the belt behavior in the vicinity of each printing portion 101.

In another aspect of this disclosure, image forming apparatus 100 may carry out the processing steps similarly to image forming apparatus 300 using one behavior detector 104 and one phase detector 105. For instance, image forming apparatus 100 may prestore information on distances from behavior detector 104 to printing portions 101 and then estimate the behavior of belt 102 in the vicinity of each printing portion 101 based on the behavior of belt 102 obtained from behavior detector 104. This may allow image forming apparatus 100 to carry out the processing steps similarly to image forming apparatus 300.

Figure 4:
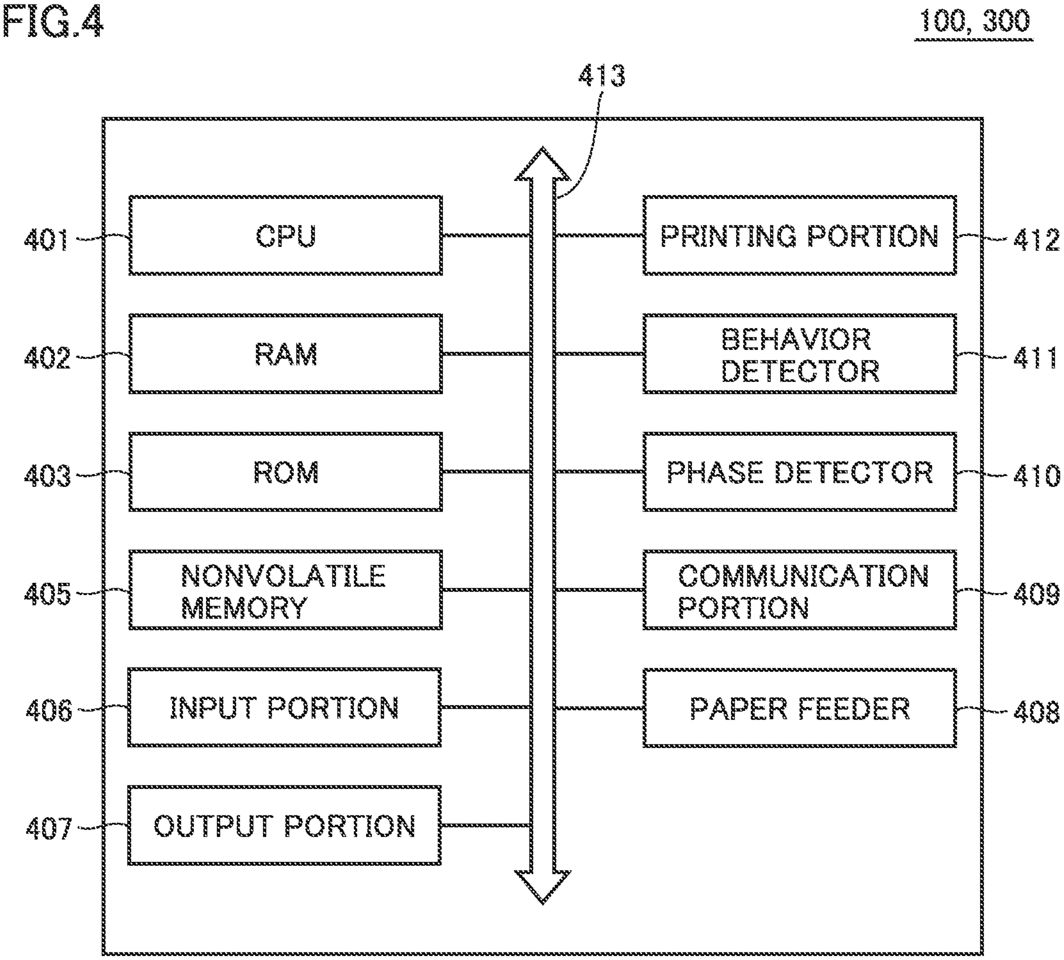
FIG. 4 is a block diagram of hardware elements of an image forming apparatus 100, 300.

FIG. 4 is a block diagram of hardware elements of an image forming apparatus 100, 300. In an aspect of this disclosure, all of the elements illustrated in FIG. 4 may be implemented as hardware. In another aspect of this disclosure, the elements illustrated in FIG. 4 may be implemented in part as software. In this instance, CPU 401 allows the elements to be performed by running a software program imported into RAM (Random Access Memory) 402. In another aspect of this disclosure, some or all of the elements to be implemented as hardware may include at least one CPU, at least one FPGA (Field Programmable Gate Array) or ASIC (Application Specific Integrated Circuit), or all or some of them combined.

Image forming apparatus 100, 300 includes CPU 401, a RAM 402, a ROM (Read Only Memory) 403, a nonvolatile memory 405, a phase detector 410, a behavior detector 411, a printing portion 412, input portion 406, output portion 407, paper feeder 408, and communication portion 409. All of these structural elements may be interconnected with a bus 413 in a manner that they are allowed to communicate with one another.

CPU 401 executes or refers to various programs and data read into RAM 402. In an aspect of this disclosure, CPU 401 may include an embedded CPU or FPGA, or may include both of them combined. CPU 401 may be allowed to execute a program(s) to perform features of image forming apparatus 100, 300.

In RAM 402 are storable programs run by CPU 401 and data referred to by CPU 401. In an aspect of this disclosure, RAM 402 may be a DRAM (Dynamic Random Access Memory) or a SRAM (Static Random Access Memory). Data stored in ROM 403 and nonvolatile memory 405, once read into RAM 402, may be accessible and referenced by CPU 401.

In ROM 403 are storable various settings and programs of image forming apparatus 100, 300. ROM 403 is usually not updated and may be used to store therein setting-related information or any programs that needs updating very infrequently. In an aspect of this disclosure, ROM 403 may be an EPROM (Erasable Programmable Read Only Memory) or EEPROM (Electrically Erasable Programmable Read Only Memory), or may be a flash memory.

Nonvolatile memory 405 is a storage in which data is storable without power supply for image forming apparatus 100, 300. In nonvolatile memory 405 are storable data and an optional program(s) run or referred to by CPU 401. In an aspect of this disclosure, nonvolatile memory 405 may be an HDD (Hard Disk Drive) or SSD (Solid State Drive). CPU 401, as required, may read programs from nonvolatile memory 405 into RAM 402 and then run the read programs.

Input portion 406 receives the input of settings from a user. Input portion 406 outputs, to CPU 401, a signal(s) corresponding to the setting input. CPU 401 runs the program based on the received setting input. In an aspect of this disclosure, input portion 406 may include buttons, a touch sensor, an audio input feature, and/or any other optional input means, or two or more of these means combined. The touch sensor may be superimposed on the display of output portion 407.

Output portion 407 displays a setting screen of image forming apparatus 100, 300, and pieces of information including job progresses and errors. In an aspect of this disclosure, output portion 407 may include for example, a liquid crystal monitor or an organic EL (Electro Luminescence) monitor.

In an aspect of this disclosure, image forming apparatus 100, 300 may include an operation panel equipped with features of input and output portions 406 and 407 both. In this instance, the operation panel may include a plurality of buttons and a display with a touch sensor (touch panel).

Paper feeder 408 transports paper out of a paper storage along the transport path of image forming apparatus 100, 300. In an aspect of this disclosure, the paper storage may be a tray or may be a paper-winding roller for long, continuous paper. In case a long sheet of paper is to be transported, image forming apparatus 100, 300 may have a cutting device at a downstream position.

Communication portion 409 communicates with other devices wirelessly or by wire. For example, communication portion 409 may be equipped to transmit logs and also receive jobs and firmware updates for image forming apparatus 100, 300. In an aspect of this disclosure, communication portion 409 may include a wired LAN (Local Area Network) port or a Wi-Fi (registered trademark; Wireless Fidelity) module. In another aspect of this disclosure, communication portion 409 may transmit and receive data using a communication protocol, for example, TCP/IP (Transmission Control Protocol/Internet Protocol) or UDP (User Datagram Protocol).

Phase detector 410 is a component that corresponds to phase detector 105 described with reference to FIGS. 1 to 3. Image forming apparatus 100 has one phase detector 410. In an aspect of this disclosure, image forming apparatus 100 may have two or more phase detectors 410 with an aim to improve the accuracy of phase detection or to use one or some of them as a backup detector(s). Image forming apparatus 300 has as many phase detectors 410 as printing portions 101. In an aspect of this disclosure, image forming apparatus 300, for cost reduction, may have less phase detectors 410 than printing portions 101. In another aspect of this disclosure, image forming apparatus 300 may have more phase detectors 410 than printing portions 101 with an aim to improve the accuracy of phase detection or to use one or some of them as a backup detector(s).

Behavior detector 411 is a component that corresponds to behavior detector 104 described with reference to FIGS. 1 to 3. Image forming apparatus 100 has one behavior detector 411. In an aspect of this disclosure, image forming apparatus 100 may have two or more behavior detectors 411 with an aim to improve the accuracy of behavior detection or to use one or some of them as a backup detector(s). Image forming apparatus 300 has as many behavior detectors 411 as printing portions 101. In an aspect of this disclosure, image forming apparatus 300, for cost reduction, may have less behavior detectors 411 than printing portions 101. In another aspect of this disclosure, image forming apparatus 300 may have more behavior detectors 411 than printing portions 101 with an aim to improve the accuracy of behavior detection or to use one or some of them as a backup detector(s).

Printing portion 412 carries out a printing process for paper. For instance, printing portion 412 may control the amount and timing of ink discharge from each printing portion 101 and may also control the amount and timing of drive of each roller 103.

<B. Information on Behavior of Belt 102>

With reference to FIGS. 5 to 8, behaviors detectable by behavior detector 104 are hereinafter described. The graphs illustrated in FIGS. 5 to 8 show values associated with time-series behaviors detected by behavior detector 104. Image forming apparatus 100, 300 may be allowed to obtain, from behavior detector 104, these values associated with time-series behaviors in the form of time-series discrete values.

Figure 5:
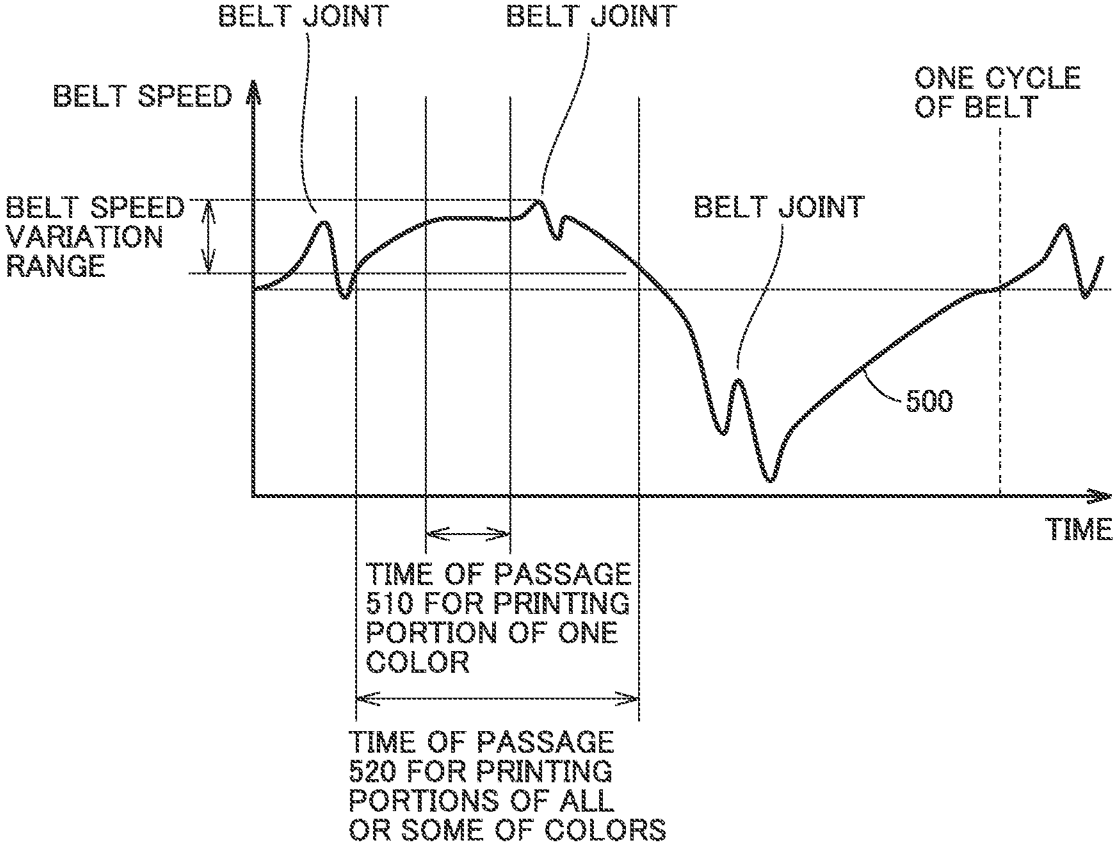
FIG. 5 is a graph that illustrates an exemplified mechanism for deciding a paper setting position using time-series belt speeds detected by a behavior detector 104.

FIG. 5 is a graph that illustrates an exemplified mechanism for deciding a paper setting position using time-series belt speeds detected by a behavior detector 104. The belt speed refers to a speed of belt 102 in its feeding direction. A graph 500 shows changes of the belt speed in one cycle of belt 102. During an uninterrupted operation of belt 102, the belt speed changes illustrated in graph 500 are repeatedly detected. This belt speed of belt 102, however, may be subject to change for each cycle due to a current condition of belt 102 and temperature changes that occur around belt 102. The temperature changes that occur around belt 102 may also affect the following factors in one cycle of belt 102; cumulative value of speed changes of belt 102 illustrated in FIG. 6, meandering speed of belt 102 illustrated in FIG. 7, and meandering amount of belt 102 illustrated in FIG. 8, possibly inviting these speeds and amount to change for each cycle.

The example of FIG. 5 shows changes of the belt speed by the time when one cycle of belt 102 is over. It is known from graph 500 that the belt speed rapidly changed three times. The points with rapid changes of the belt speed indicate the belt speeds when the belt joint 110 comes into contact with roller 103.

Image forming apparatus 100, 300 may decide the paper setting position based on the measured belt speed, so that the printing process is carried out by a timing of a smaller variation range of the belt speed. In case printing portion 101 of one color alone is used in the printing process, image forming apparatus 100, 300 may decide the paper setting position, so that the printing process is carried out during a period indicated with a time of passage 510 (period in which the belt speed variation range is smaller in an entire period of the printing using one color ink). In other words, image forming apparatus 100, 300 may decide the paper setting position, so that the paper printing process is carried out by a timing of detection of the belt speed by behavior detector 104 during time of passage 510. For instance, image forming apparatus 100, 300 may prestore distances from behavior detector 104 to printing portions 101 (offset) in nonvolatile memory 405. Image forming apparatus 100, 300 may be allowed to decide a timing of setting of the paper on belt 102 (or position on belt 102 at which the paper is set) based on a timing of detection of the belt speed by behavior detector 104 and the distance from behavior detector 104 to each printing portion 101.

In case all or some of printing portions 101 of different colors are used in the printing process, image forming apparatus 100, 300 may decide the paper setting position, so that the printing process is carried out during a period indicated with a time of passage 520 (period in which the belt speed variation range is smaller in an entire period of the printing using two or more inks).

In an aspect of this disclosure, image forming apparatus 100, 300 may decide the paper setting position, so that the printing process is carried out during a period (or interval) in which the belt speed variation range reduces to the minimum in one cycle of belt 102. In another aspect of this disclosure, image forming apparatus 100, 300 may decide the paper setting position, so that the printing process is carried out during a period (or interval) in which the belt speed variation range is less than or equal to a predefined threshold in one cycle of belt 102. In another aspect of this disclosure, image forming apparatus 100, 300 may decide a plurality of paper setting positions, so that the printing process is carried out during each of a plurality of periods (or intervals) in one cycle of belt 102. In this instance, the setting positions thus selected may be paper setting positions at which the belt speed variation range is less than or equal to the predefined threshold.

In an aspect of this disclosure, image forming apparatus 100, 300 may decide the paper setting position, so that the printing process is carried out during a period (or interval) in which the belt speed variation range is smaller in one cycle of belt 102. Thus, image forming apparatus 100, 300 may prevent that such belt speed changes invite image distortion in the feeding direction of belt 102. This may allow a stable printing quality to be constantly obtained.

Figure 6:
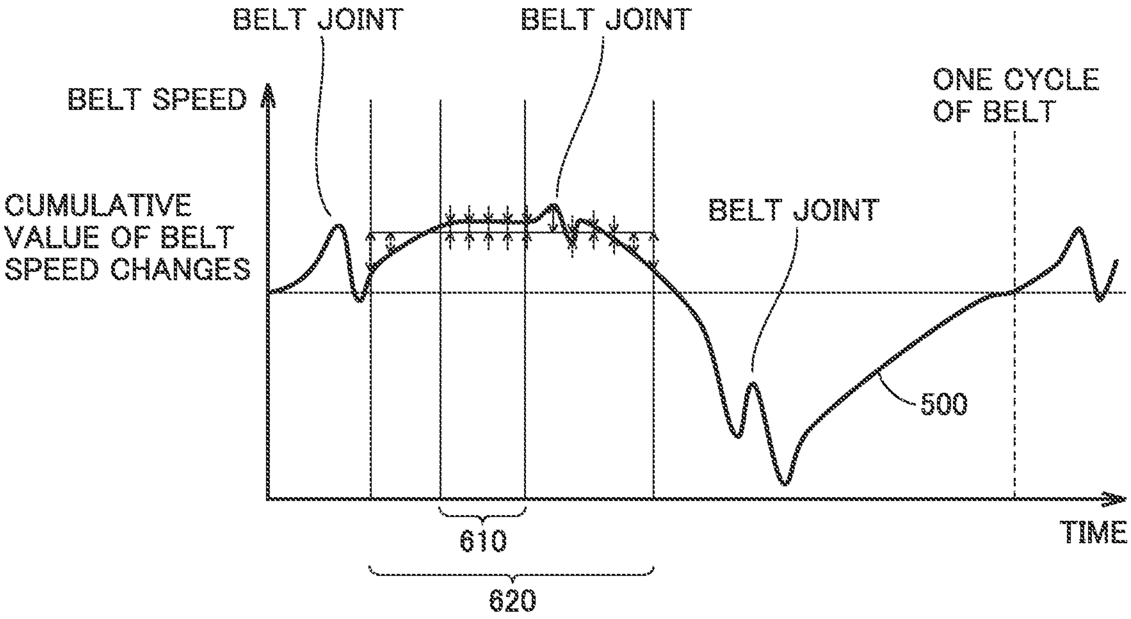
FIG. 6 is a graph that illustrates an exemplified mechanism for deciding a paper setting position using a cumulative value of changes of the time-series belt speeds detected by the behavior detector 104.

FIG. 6 is a graph that illustrates an exemplified mechanism for deciding a paper setting position using a cumulative value of changes of the time-series belt speeds detected by the behavior detector 104. Image forming apparatus 100, 300 may decide the paper setting position, so that the printing process is carried out at a timing of a smaller cumulative value of the belt speed changes (integrated value) during the printing process, instead of the belt speed changes, as illustrated in FIG. 6. In an aspect of this disclosure, behavior detector 104 may integrate the detected changes of the belt speed and output an integration result (cumulative value) thus obtained to CPU 401. In another aspect of this disclosure, CPU 401 may integrate the belt speed changes (cumulative value) obtained from behavior detector 104.

In case printing portion 101 of one color alone is used in the printing process, image forming apparatus 100, 300 may decide the paper setting position, so that the printing process is carried out during a period indicated with a time of passage 610 (period in which a cumulative value of the belt speed changes is smaller in an entire period of the printing using one color ink). In other words, image forming apparatus 100, 300 may decide the paper setting position, so that the paper printing process is carried out by a timing of detection of the belt speed by behavior detector 104 during time of passage 610. In an aspect of this disclosure, image forming apparatus 100, 300 may decide the paper setting position, so that the printing process is carried out during a period (or interval) in which the cumulative value of belt speed changes reduces to the minimum in one cycle of belt 102. In another aspect of this disclosure, image forming apparatus 100, 300 may decide the paper setting position, so that the printing process is carried out during a period (or interval) in which the cumulative value of belt speed changes is less than or equal to a predefined threshold in one cycle of belt 102.

When the cumulative value of belt speed changes is employed, image forming apparatus 100, 300 may likewise prestore distances from behavior detector 104 to printing portions 101 (offset) in nonvolatile memory 405. Image forming apparatus 100, 300 may be allowed to decide a timing of setting of the paper on belt 102 (or position on belt 102 at which the paper is set) based on a timing of detection of the belt speed by behavior detector 104 and the distance from behavior detector 104 to each printing portion 101.

In case all or some of printing portions 101 of different colors are used in the printing process, image forming apparatus 100, 300 may decide the paper setting position, so that the printing process is carried out during a period indicated with a time of passage 620 (period in which the cumulative value of belt speed changes is smaller in an entire period of the printing using two or more inks).

As described earlier, image forming apparatus 100, 300 may decide the paper setting position, so that the printing process is carried out during a period (or interval) in which the cumulative value (integrated value) of belt speed changes is smaller in one cycle of belt 102. Thus, image forming apparatus 100, 300 may prevent that such belt speed changes invite image distortion in the feeding direction of belt 102. This may allow a stable printing quality to be constantly obtained.

Image forming apparatus 100, 300, by deciding the paper setting position based on the belt speed changes, may effectively keep a constant printing quality against relatively sudden speed changes of belt 102. Image forming apparatus 100, 300, by deciding the paper setting position based on the cumulative value of belt speed changes, may effectively keep a constant printing quality against relatively moderate speed changes of belt 102. In an aspect of this disclosure, image forming apparatus 100, 300 may select, depending on the magnitude of speed changes of belt 102, either one of the belt speed changes or the cumulative value of belt speed changes as a parameter used to decide the paper setting position.

Figure 7:
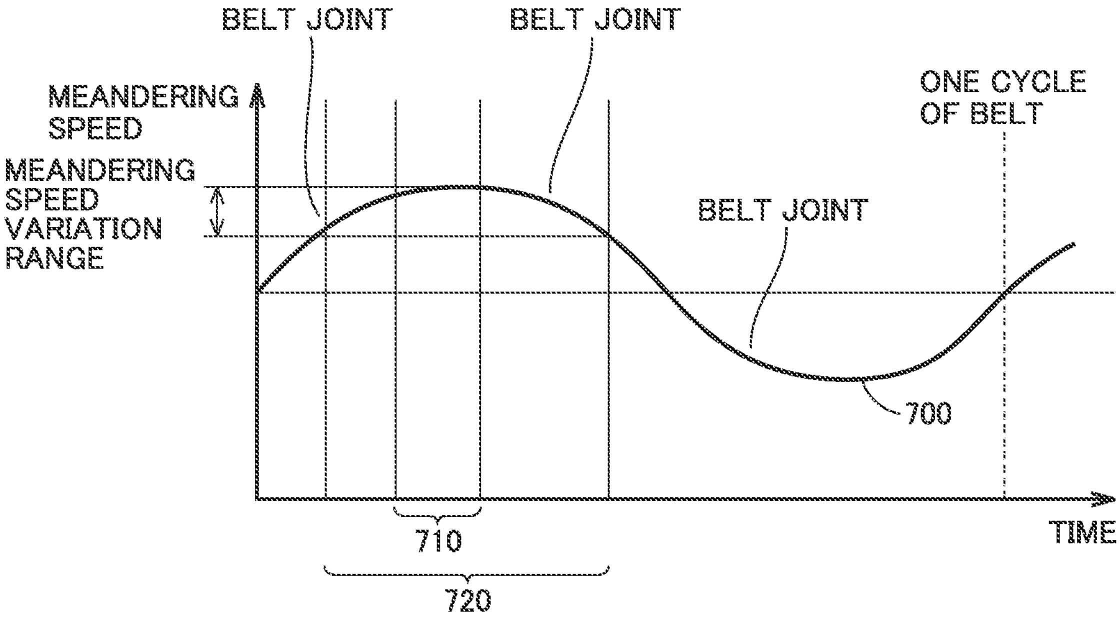
FIG. 7 is a graph that illustrates an exemplified mechanism for deciding a paper setting position using time-series meandering speeds detected by the behavior detector 104.

FIG. 7 is a graph that illustrates an exemplified mechanism for deciding a paper setting position using time-series meandering speeds detected by the behavior detector 104. The meandering speed refers to a speed in a direction perpendicular to the feeding direction of belt 102 (meandering direction). A graph 700 shows changes of the meandering speed in one cycle of belt 102. During an uninterrupted operation of belt 102, changes of the meandering speed illustrated in graph 700 are repeatedly detected. The example of FIG. 7 shows changes of the meandering speed by the time when one cycle of belt 102 is over. The meandering speed may increase when joint 110 of belt 102 comes into contact with roller 103.

Image forming apparatus 100, 300 may decide the paper setting position based on the measured meandering speed, so that the printing process is carried out by a timing of a smaller variation range of the belt speed. In case printing portion 101 of one color alone is used in the printing process, image forming apparatus 100, 300 may decide the paper setting position, so that the printing process is carried out during a period indicated with a time of passage 710 (period in which the meandering speed variation range is smaller in an entire period of the printing using one color ink). In other words, image forming apparatus 100, 300 may decide the paper setting position, so that the paper printing process is carried out by a timing of detection of the meandering speed by behavior detector 104 during time of passage 710. For instance, image forming apparatus 100, 300 may prestore distances from behavior detector 104 to printing portions 101 (offset) in nonvolatile memory 405. Image forming apparatus 100, 300 may be allowed to decide a timing of setting of the paper on belt 102 (or position on belt 102 at which the paper is set) based on a timing of detection of the meandering speed by behavior detector 104 and the distance from behavior detector 104 to each printing portion 101.

In case all or some of printing portions 101 of different colors are used in the printing process, image forming apparatus 100, 300 may decide the paper setting position, so that the printing process is carried out during a period indicated with a time of passage 720 (period in which the meandering speed variation range is smaller in an entire period of the printing using two or more inks).

In an aspect of this disclosure, image forming apparatus 100, 300 may decide the paper setting position, so that the printing process is carried out during a period (or interval) in which the meandering speed variation range reduces to the minimum in one cycle of belt 102. In another aspect of this disclosure, image forming apparatus 100, 300 may decide the paper setting position, so that the printing process is carried out during a period (or interval) in which the meandering speed variation range is less than or equal to a predefined threshold in one cycle of belt 102. In another aspect of this disclosure, image forming apparatus 100, 300 may decide a plurality of paper setting positions, so that the printing process is carried out during each of a plurality of periods (or intervals) in one cycle of belt 102. In this instance, the setting positions thus selected may be paper setting positions at which the meandering speed variation range is less than or equal to the predefined threshold.

As described earlier, image forming apparatus 100, 300 may decide the paper setting position, so that the printing process is carried out during a period (or interval) in which the meandering speed variation range is smaller in one cycle of belt 102. Thus, image forming apparatus 100, 300 may prevent that such meandering speed changes affect an image to be printed, inviting distortion of the image in the meandering direction of belt 102. Thus, a stable printing quality may be constantly obtained.

Figure 8:
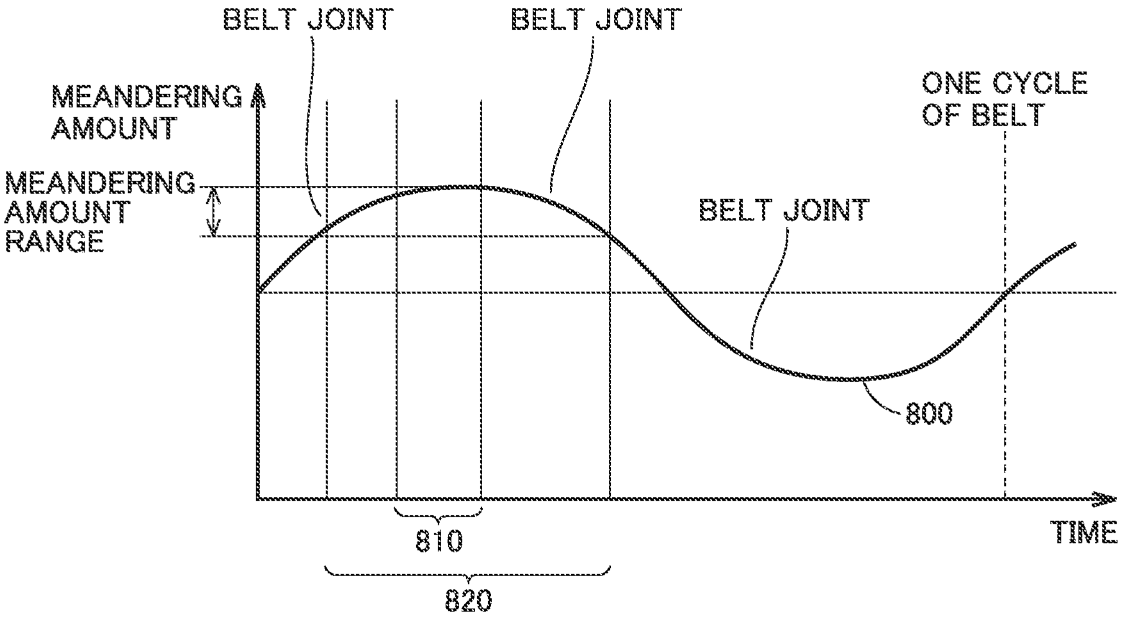
FIG. 8 is a graph that illustrates an exemplified mechanism for deciding a paper setting position using changes of time-series meandering amounts detected by the behavior detector 104.

FIG. 8 is a graph that illustrates an exemplified mechanism for deciding a paper setting position using changes of time-series meandering amounts detected by the behavior detector 104. A graph 800 shows changes of the meandering amount in one cycle of belt 102. Image forming apparatus 100, 300 may decide the paper setting position, so that the printing process is carried out at a timing of smaller changes of the meandering amount during the printing process instead of the meandering speed changes, as illustrated in FIG. 8. In an aspect of this disclosure, behavior detector 104 may calculate the meandering amount from the detected meandering speed and then output a calculation result (meandering amount) thus obtained to CPU 401. In another aspect of this disclosure, CPU 401 may calculate the meandering amount from the meandering speed obtained from behavior detector 104.

In case printing portion 101 of one color alone is used in the printing process, image forming apparatus 100, 300 may decide the paper setting position, so that the printing process is carried out during a period indicated with a time of passage 810 (period in which the meandering amount variation range is smaller in an entire period of the printing using one color ink). In other words, image forming apparatus 100, 300 may decide the paper setting position, so that the paper printing process is carried out by a timing of detection of the meandering amount by behavior detector 104 during time of passage 810.

When the meandering amount is employed, image forming apparatus 100, 300 may likewise prestore distances from behavior detector 104 to printing portions 101 (offset) in nonvolatile memory 405. Image forming apparatus 100, 300 may be allowed to decide a timing of setting of the paper on belt 102 (or position on belt 102 at which the paper is set) based on a timing of detection of the meandering speed (or meandering amount) by behavior detector 104 and the distance from behavior detector 104 to each printing portion 101. In an aspect of this disclosure, image forming apparatus 100, 300 may decide the paper setting position, so that the printing process is carried out during a period (or interval) in which the meandering amount variation range reduces to the minimum in one cycle of belt 102. In another aspect of this disclosure, image forming apparatus 100, 300 may decide the paper setting position, so that the printing process is carried out during a period (or interval) in which the meandering amount variation range is less than or equal to a predefined threshold in one cycle of belt 102.

In case all or some of printing portions 101 of different colors are used in the printing process, image forming apparatus 100, 300 may decide the paper setting position, so that the printing process is carried out during a period indicated with a time of passage 820 (period in which the meandering amount changes are smaller in an entire period of the printing using two or more inks).

As described earlier, image forming apparatus 100, 300 may decide the paper setting position, so that the printing process is carried out during a period (or interval) in which the meandering amount variation range is smaller in one cycle of belt 102. Thus, image forming apparatus 100, 300 may prevent that such meandering amount changes affect an image to be printed, inviting distortion of the image in the meandering direction of belt 102. Thus, a stable printing quality may be constantly obtained.

Image forming apparatus 100, 300, by deciding the paper setting position based on the meandering speed changes, may effectively keep a constant printing quality against relatively sudden changes of the meandering speed of belt 102. Image forming apparatus 100, 300, by deciding the paper setting position based on the meandering amount changes, may effectively keep a constant printing quality against relatively moderate changes of the meandering speed of belt 102. In an aspect of this disclosure, image forming apparatus 100, 300 may select either one of the meandering speed changes or the meandering amount changes as a parameter used to decide the paper setting position.

The methods for deciding the paper setting position described with reference to FIGS. 5 to 8 may be suitably combined and used. In image forming apparatus 100, 300, for example, each of the belt speed, cumulative belt speed, meandering speed and meandering amount is multiplied by a coefficient, and all of values thus obtained are then summed to calculate a value indicative of the behavior of belt 102. Image forming apparatus 100, 300 may decide the paper setting position, so that the value indicative of the behavior of belt 102 has a smallest value. Image forming apparatus 100, 300 may decide the paper setting position, so that the value indicative of the behavior of belt 102 is less than or equal to a predefined threshold. Image forming apparatus 100, 300 may select two or more paper setting positions at which the value indicative of the behavior of belt 102 is less than or equal to the predefined threshold.

For example, image forming apparatus 100, 300 may calculate the value indicative of the behavior of belt 102 using part of the belt speed, cumulative belt speed, meandering speed and meandering amount.

Thus, image forming apparatus 100, 300 may successfully control possible distortion of an image to be printed in the feeding direction and in the meandering direction of belt 102 through combined use of different parameters indicative of the behavior of belt 102. As a result, a constant level of printing quality may be reliably attained.

In an aspect of this disclosure, image forming apparatus 100, 300 may estimate whether belt 102 is degraded based on all or part of the belt speed, cumulative belt speed, meandering speed and meandering amount. In image forming apparatus 100, 300, for example, each of the belt speed, cumulative belt speed, meandering speed and meandering amount is multiplied by a coefficient, and all of values thus obtained are then summed to calculate a value indicative of the behavior of belt 102. Then, image forming apparatus 100, 300 may be allowed to estimate whether belt 102 is degraded based on whether the value indicative of the behavior of belt 102 is more than or equal to a predefined threshold. Image forming apparatus 100, 300 may output a notice to, for example, display-equipped output portion 407 when the degradation of belt 102 is estimated. Otherwise, image forming apparatus 100 may output (transmit) the notice to another apparatus through communication portion 409 or may output the notice to both of output portion 407 and communication portion 409. This may allow image forming apparatus 100, 300 to estimate whether belt 102 is degraded based on the behavior of belt 102 in its feeding direction and/or meandering direction and then notify a user or an administrator of belt 102 degraded in quality.

<C. Flowchart>

Figure 9:
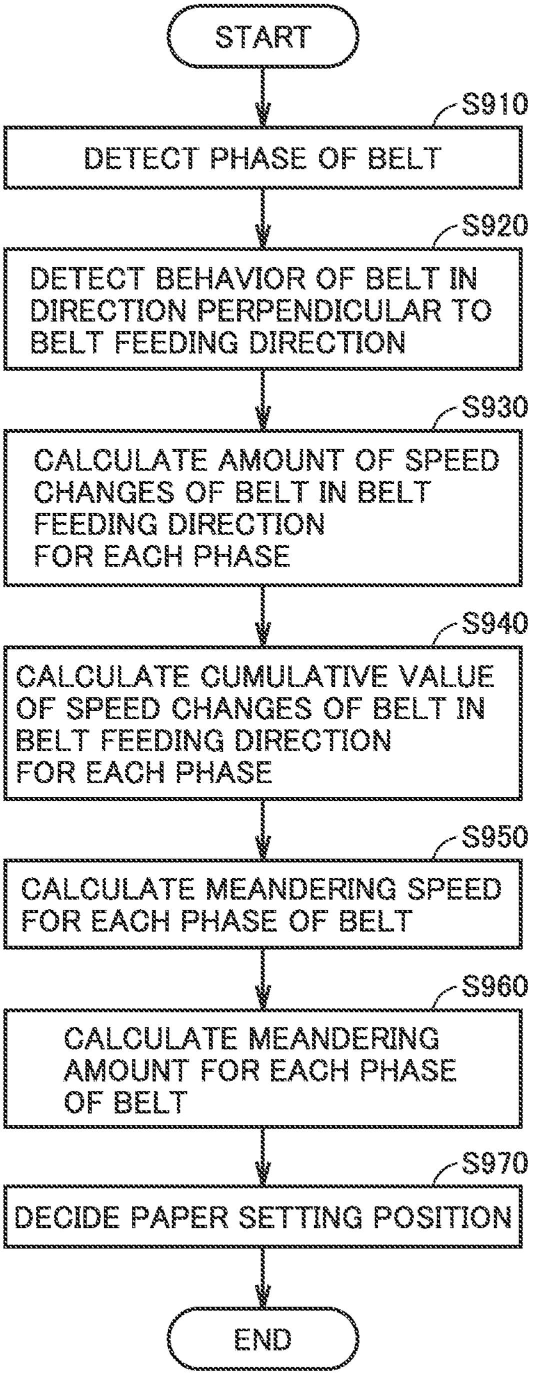
FIG. 9 is a flow chart of processing steps for deciding a paper setting position in the image forming apparatus 100, 300.

FIG. 9 is a flow chart of processing steps for deciding a paper setting position in the image forming apparatus 100, 300. In an aspect of this disclosure, CPU 401 may read a program for process execution as illustrated in FIG. 9 from ROM 403 or nonvolatile memory 405 into RAM 402 and then run the read program. In another aspect of this disclosure, the processing steps in whole or in part are also feasible in the form of a combination of circuit elements configured to execute these processing steps.

In step S910, CPU 401 detects the phase of belt 102. Specifically, CPU 401 detects the phase of belt 102 based on a signal obtained from phase detector 105. CPU 401 of image forming apparatus 300 may detect the phase of belt 102 immediately below or in the vicinity of each printing portion 101 based on a signal obtained from phase detector 105 disposed near each printing portion 101.

In step S920, CPU 401 detects the behavior of belt 102 in a direction perpendicular to the feeding direction of belt 102 (meandering direction). Specifically, CPU 401 detects the behavior of belt 102 in the meandering direction based on a signal obtained from behavior detector 104. In an aspect of this disclosure, the behavior of belt 102 in the meandering direction detected by CPU 401 may contain information regarding the meandering speed or meandering amount of belt 102 or information regarding both of the meandering speed and amount.

In step S930, CPU 401 may calculate the amount of speed changes of belt 102 in its feeding direction for each phase. Specifically, CPU 401 detects the amount of speed changes of belt 102 in its feeding direction for each phase based on a signal obtained from behavior detector 104. CPU 401 may calculate the speed changes during an optional short interval (for example, from phase A to phase B of belt 102) in the feeding diction. In an aspect of this disclosure, CPU 401 may calculate the amount of speed changes of belt 102 in its feeding direction for each phase based on a signal obtained from phase detector 105 (using, for example, phase and timestamp of phase detection).

In step S940, CPU 401 calculates a cumulative value of the speed changes of belt 102 in its feeding direction for each phase. CPU 401 may calculate a cumulative value of the speed changes in the feeding direction during an optional short interval (for example, from phase C to phase D of belt 102) in the feeding diction. At the time, CPU 401 may integrate the speed changes of belt 102 in its feeding direction for each phase calculated in step S930.

In step S950, CPU 401 may calculate the meandering speed for each phase of belt 102. Specifically, CPU 401 calculates the meandering speed of belt 102 for each phase based on a signal obtained from behavior detector 104. In one example, CPU 401 may calculate the meandering speed during an optional short interval (for example, from phase E to phase F of belt 102). CPU 401 of image forming apparatus 300 may detect the meandering speed immediately below or in the vicinity of each printing portion 101 based on a signal obtained from behavior detector 104 disposed near each printing portion 101.

In step S960, CPU 401 may calculate the meandering amount for each phase of belt 102. CPU 401 may calculate the meandering amount during an optional short interval (for example, from phase G to phase H of belt 102). At the time, CPU 401 may calculate the meandering amount based on the meandering speed calculated in step S950.

In step S970, CPU 401 decides the paper setting position. In an aspect of this disclosure, CPU 401 may use one of the amount of belt speed changes, cumulative amount of belt speed changes, meandering speed, and meandering amount as a parameter used to decide the paper setting position.

In another aspect of this disclosure, CPU 401 may combine and use all or some of the amount of belt speed changes, cumulative amount of belt speed changes, meandering speed, and meandering amount as a parameter used to decide the paper setting position.

CPU 401 may decide the paper setting position, so that the parameter has a smallest value, or CPU 401 may decide the paper setting position, so that the parameter value is less than or equal to a predefined threshold (or less than the threshold).

As described thus far, image forming apparatus 100, 300 according to this embodiment detects, for each phase, the behavior of belt 102 for printing use. Image forming apparatus 100, 300 sets the paper at a position less or hardly affected by the behavior of belt 102 based on the behavior of belt 102 for each phase. This may allow image forming apparatus 100, 300 to control adverse impacts caused by the behavior of belt 102 during the printing in the feeding direction and/or meandering direction. Image forming apparatus 100, 300 may use, as a parameter indicative of the behavior of belt 102 for each phase, all or part of the speed changes of belt 102 in its feeding direction, cumulative speed of belt 102 in its feeding direction, speed of belt 102 in the meandering direction, and meandering amount of belt 102.

In an aspect of this disclosure, image forming apparatus 100, 300 may set the paper at plurality of positions at which any impact caused by the behavior of belt 102 lessens based on the behavior of belt 102 for each phase. This may allow image forming apparatus 100, 300 to control adverse impacts caused by the behavior of belt 102 during the printing and also prevent possible decline in printing efficiency.

In another aspect of this disclosure, image forming apparatus 100, 300 may be allowed to estimate whether belt 102 is degraded based on the behavior of belt 102 for each phase and then output a notice to output portion 407 and/or communication portion 409 in case the degradation of belt 102 is confirmed. Thus, image forming apparatus 100, 300 may advise a user or an administrator to replace the degraded belt 102 with a new one to keep a certain level of or an even higher level of quality of belt 102.

Although embodiments of the present disclosure have been described and illustrated in detail, the disclosed embodiments are made for purposes of illustration and example only and not limitation. The scope of the present disclosure should be interpreted by terms of the appended claims.

What is claimed is:

1. An image forming apparatus, comprising:
one or more printing portions that print a printing object on paper;
a belt in a form of a loop, the belt serving to transport the paper to a printing position;
a roller that feeds the belt;
a phase detector that detects a phase of the belt;
a behavior detector that detects a behavior of the belt;
a controller that decides a paper setting position of a location on the belt where the paper is to be positioned based on the behavior of the belt for each phase; and
a paper feeder that transports the paper to the decided location on the belt based on the behavior of the belt for each phase.

2. The image forming apparatus according to claim 1, wherein deciding the paper setting position on the belt based on the behavior of the belt for each phase comprises deciding the paper setting position so that the behavior of the belt reduces to minimum or is less than or equal to a predefined threshold during a period in which the paper is passing the one or more printing portions.

3. The image forming apparatus according to claim 2, wherein deciding the paper setting position so that the behavior of the belt reduces to minimum or is less than or equal to the predefined threshold during the period in which the paper is passing the one or more printing portions comprises deciding the paper setting position so that a speed change of the belt in a feeding direction thereof reduces to minimum or is less than or equal to the predefined threshold during the period in which the paper is passing the one or more printing portions.

4. The image forming apparatus according to claim 2, wherein deciding the paper setting position so that the behavior of the belt reduces to minimum or is less than or equal to the predefined threshold during the period in which the paper is passing the one or more printing portions comprises deciding the paper setting position so that a cumulative value of speed changes of the belt in a feeding direction thereof reduces to minimum or is less than or equal to the predefined threshold during the period in which the paper is passing the one or more printing portions.

5. The image forming apparatus according to claim 2, wherein deciding the paper setting position so that the behavior of the belt reduces to minimum or is less than or equal to the predefined threshold during the period in which the paper is passing the one or more printing portions comprises deciding the paper setting position so that a meandering speed change of the belt reduces to minimum or is less than or equal to the predefined threshold during the period in which the paper is passing the one or more printing portions.

6. The image forming apparatus according to claim 2, wherein deciding the paper setting position so that the behavior of the belt reduces to minimum or is less than or equal to the predefined threshold during the period in which the paper is passing the one or more printing portions comprises deciding the paper setting position so that a meandering amount change of the belt reduces to minimum or is less than or equal to the predefined threshold during the period in which the paper is passing the one or more printing portions.

7. The image forming apparatus according to claim 2, wherein
the one or more printing portions comprise printing portions of a plurality of colors, and
the period in which the paper is passing the one or more printing portions is a period in which the paper is passing all of the printing portions of the plurality of colors.

8. The image forming apparatus according to claim 2, wherein
the one or more printing portions comprise printing portions of a plurality of colors, the controller selects, from the printing portions of the plurality of colors, one or more printing portions to be used in a printing process, and the period in which the paper is passing the one or more printing portions is a period in which the paper passing the one or more printing portions selected.

9. The image forming apparatus according to claim 8, further comprising a input portion and communication portion, wherein selecting, from the printing portions of the plurality of colors, the one or more printing portions to be used in the printing process comprises selecting, from the printing portions of the plurality of colors, the one or more printing portions to be used in the printing process based on an input of color designation received through the input portion or the communication portion.

10. The image forming apparatus according to claim 8, wherein the controller analyzes image data to be printed on the paper, and selecting, from the printing portions of the plurality of colors, the one or more printing portions to be used in the printing process comprises selecting, from the printing portions of the plurality of colors, the one or more printing portions to be used in the printing process based on a result obtained by analyzing the image data.

11. The image forming apparatus according to claim 10, wherein the result obtained by analyzing the image data includes a coverage of the plurality of colors in the image data.

12. The image forming apparatus according to claim 8, wherein the behavior detector comprises a plurality of behavior detectors, each of the plurality of behavior detectors is disposed in a vicinity of each of the printing portions of the plurality of colors, and detects the behavior of the belt near each of the printing portions of the plurality of colors.

13. The image forming apparatus according to claim 1, wherein deciding the paper setting position on the belt based on the behavior of the belt for each phase comprises selecting, as the paper setting position on the belt, a plurality of intervals on the belt based on the behavior of the belt for each phase.

14. The image forming apparatus according to claim 1, wherein the controller estimates whether the belt is degraded based on a result obtained by detecting the behavior of the belt.

15. The image forming apparatus according to claim 14, wherein the controller outputs a notice based on a result of the estimated degradation of the belt.

16. A control method for an image forming apparatus, the control method comprising:

detecting a phase of a belt in a form of a loop, the belt serving to transport paper to a printing position;

detecting a behavior of the belt, deciding a paper setting position on the belt based on the behavior of the belt for each phase; and transporting the paper to the paper setting position decided.

17. The control method according to claim 16, wherein deciding the paper setting position on the belt based on the behavior of the belt for each phase comprises deciding the paper setting position so that the behavior of the belt reduces to minimum or is less than or equal to a predefined threshold during a period in which the paper is passing the one or more printing portions.

18. The control method according to claim 17, wherein deciding the paper setting position so that the behavior of the belt reduces to minimum or is less than or equal to the predefined threshold during the period in which the paper is passing the one or more printing portions comprises deciding the paper setting position so that a speed change of the belt in a feeding direction thereof reduces to minimum or is less than or equal to the predefined threshold during the period in which the paper is passing the one or more printing portions.

19. The control method according to claim 17, wherein deciding the paper setting position so that the behavior of the belt reduces to minimum or is less than or equal to the predefined threshold during the period in which the paper is passing the one or more printing portions comprises deciding the paper setting position so that a cumulative value of speed changes of the belt in a feeding direction thereof reduces to minimum or is less than or equal to the predefined threshold during the period in which the paper is passing the one or more printing portions.

20. The control method according to claim 17, wherein deciding the paper setting position so that the behavior of the belt reduces to minimum or is less than or equal to the predefined threshold during the period in which the paper is passing the one or more printing portions comprises deciding the paper setting position so that a meandering speed change of the belt reduces to minimum or is less than or equal to the predefined threshold during the period in which the paper is passing the one or more printing portions.

* * * * *